United States Patent
Wand

(10) Patent No.: US 11,173,807 B2
(45) Date of Patent: Nov. 16, 2021

(54) BATTERY CHARGE EQUALIZATION SYSTEM TIMER

(71) Applicant: Ford Global Technologies, LLC, Dearborn, MI (US)

(72) Inventor: Thomas Joseph Wand, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1196 days.

(21) Appl. No.: 15/618,600

(22) Filed: Jun. 9, 2017

(65) Prior Publication Data

US 2018/0354387 A1    Dec. 13, 2018

(51) Int. Cl.
| | |
|---|---|
| H01M 10/00 | (2006.01) |
| B60L 58/20 | (2019.01) |
| H01M 10/42 | (2006.01) |
| H01M 10/625 | (2014.01) |
| B60K 6/28 | (2007.10) |

(52) U.S. Cl.
CPC .............. B60L 58/20 (2019.02); B60K 6/28 (2013.01); H01M 10/42 (2013.01); H01M 10/425 (2013.01); H01M 10/625 (2015.04); B60Y 2200/92 (2013.01); B60Y 2400/112 (2013.01); H01M 2220/20 (2013.01); Y10S 903/907 (2013.01)

(58) Field of Classification Search
CPC ........ B60K 6/48; B60L 58/20; H01M 10/425; B60Y 2400/112
See application file for complete search history.

(56) References Cited

U.S. PATENT DOCUMENTS

| | | | |
|---|---|---|---|
| 9,322,885 B2 | 4/2016 | Kain | |
| 2014/0354234 A1* | 12/2014 | Sudan | H02J 4/00 320/127 |
| 2015/0341041 A1* | 11/2015 | Balachandran | H03L 7/085 327/156 |

(Continued)

FOREIGN PATENT DOCUMENTS

| | | |
|---|---|---|
| CN | 204992686 U | 1/2016 |
| DE | 102012205016 A1 | 10/2013 |

OTHER PUBLICATIONS

Semiconductor Components Industries, LLC, 24-Stage Frequency Divider, MC14521B, Jul. 2014, Rev. 10, 8 pages.

(Continued)

*Primary Examiner* — Cynthia H Kelly
*Assistant Examiner* — Monique M Wills
(74) *Attorney, Agent, or Firm* — Brooks Kushman PC; David Kelley

(57) ABSTRACT

A battery system includes a traction battery, a traction battery controller, and a backup controller. The traction battery powers a high-voltage domain. The traction battery controller may be powered by a low-voltage domain that is separated from the high-voltage domain. The traction battery may be configured to disable cell balancing of the traction battery after expiration of a main timer. The backup controller may be powered by and within the high-voltage domain. The backup controller implements a backup timer, that includes a non-processor logic circuit, and is configured to disable cell balancing after expiration of the backup timer.

20 Claims, 3 Drawing Sheets

(56) References Cited

U.S. PATENT DOCUMENTS

2016/0087317 A1* 3/2016 Klesyk ................ H05B 1/0236
219/488

OTHER PUBLICATIONS

Texas Instruments, CMOS 24-Stage Frequency Divider, CD4521B Types, Oct. 2003, 18 pages.
Texas Instruments, SN74LS29x Programmable Frequency Dividers and Digital Timers, SN74LS292, SN74LS294, Revised Jan. 2016, 19 pages.

* cited by examiner

BATTERY CHARGE EQUALIZATION SYSTEM TIMER

TECHNICAL FIELD

This application generally relates to energy management for hybrid vehicles.

BACKGROUND

Many power packs such as a battery pack have an operating voltage greater than a voltage of a single cell of the power pack. For example, a voltage of a traction battery pack for a hybrid-electric vehicle may be 200-300 Volts DC while a voltage of a single battery cell may be 1-4 Volts DC. The 1-4V DC range for a single battery cell typically is associated with the technology of the battery cell. For example, a Nickel Metal Hydride (NiMH) battery cell typically has a cell voltage of approximately 1.2 Volts and a Lithium Ion (Li-Ion) battery cell typically has a cell voltage of approximately 3.6 Volts. A hybrid-electric vehicle traction battery provides power for vehicle propulsion and accessories. To meet the voltage and current requirements, the traction battery is typically multiple battery cells connected in a combination of series and parallel. During vehicle operation, the traction battery may be charged or discharged based on operating conditions including a battery state of charge (SOC), internal combustion engine (ICE) operation, driver demand and regenerative braking. A state of charge of individual battery cells within a battery pack may be unequal based on many factors including variations in manufacturing, cell age, cell temperature, or cell technology. Battery cell balancing may be used to re-balance individual battery cell's state of charge within the battery pack and improve operation of the battery pack.

SUMMARY

A battery system includes a traction battery, a traction battery controller, and a backup controller. The traction battery powers a high-voltage domain. The traction battery controller may be powered by a low-voltage domain that is separated from the high-voltage domain. The traction battery may be configured to disable cell balancing of the traction battery after expiration of a main timer. The backup controller may be powered by and within the high-voltage domain. The backup controller implements a backup timer, that includes a non-processor logic circuit, and is configured to disable cell balancing after expiration of the backup timer.

A battery system includes a traction battery, a traction battery controller, and a backup timer. The traction battery may source a high-voltage domain. The traction battery controller may be Galvanically isolated from the high-voltage domain and configured to inhibit cell balancing of the traction battery after a timeout duration. The backup timer may be powered by and within the high-voltage domain, may include an oscillator and digital logic, and may be configured to inhibit cell balancing of the traction battery after a backup duration that is greater than the timeout duration.

A traction battery includes battery cells, cell balancing circuitry, and a backup timer. The battery cells create a high-voltage domain. The cell balancing circuitry may be configured to be disabled by a Galvanically isolated controller after a timeout duration. The backup timer, powered by and within the high-voltage domain, may include an oscillator and digital logic, and may be configured to disable cell balancing of the traction battery after a backup duration that is greater than the timeout duration.

DETAILED DESCRIPTION

Figure 1:
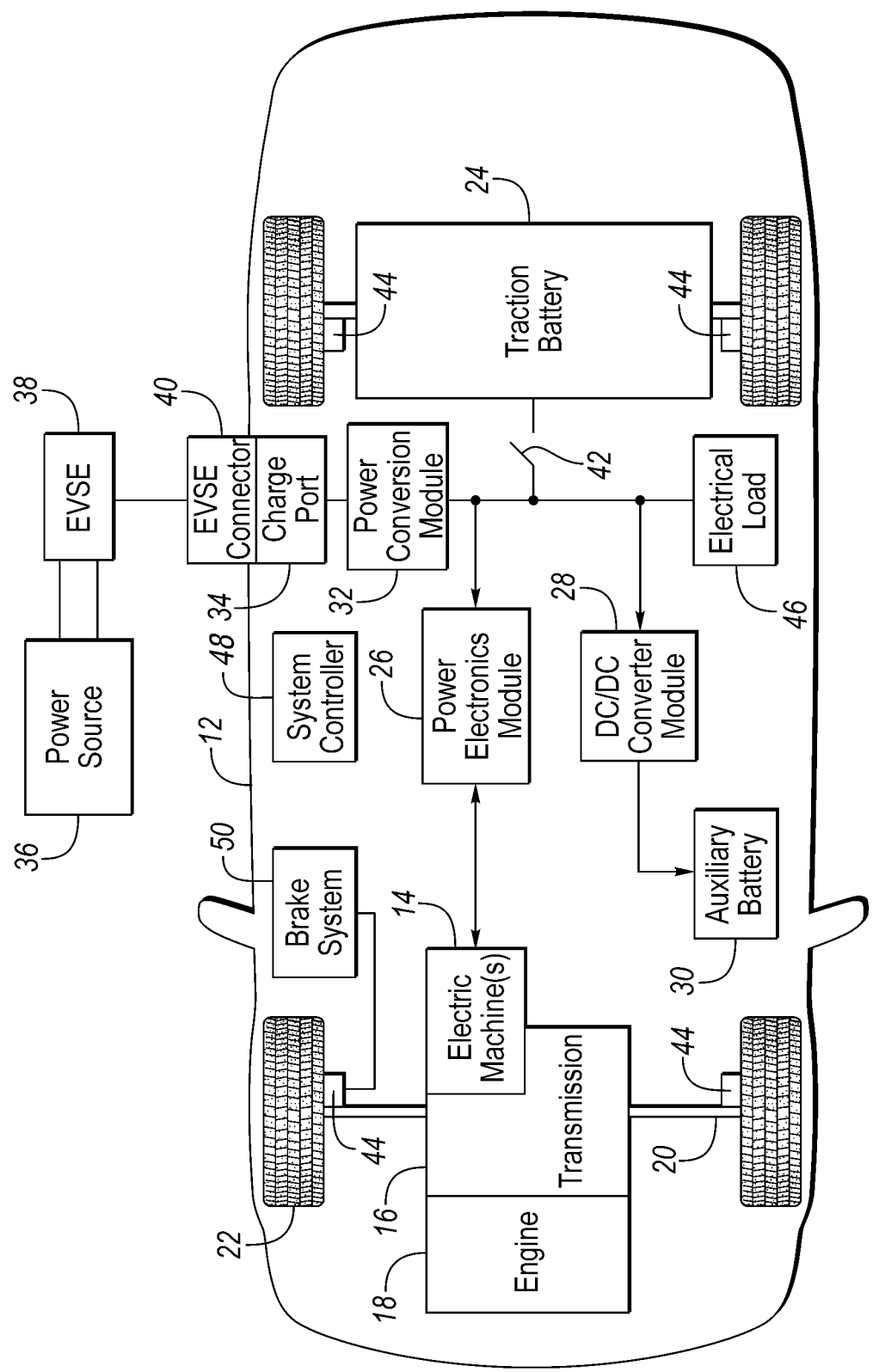
FIG. 1 is an exemplary diagram of a hybrid vehicle illustrating typical drivetrain and energy storage components.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electric devices may be configured to execute a computer-program that is embodied in a non-transitory computer readable medium that is programmed to perform any number of the functions as disclosed.

Power packs such as battery packs are typically made of multiple cells connected in parallel to form a cell group and multiple cell groups connected in series to form the battery pack. Battery packs are often used as a source of power for common electronic devices including electrified vehicles, consumer electronics, industrial devices, and medical devices. Multiple cell groups connected in series allow use of a low voltage power cell to be used to power a high voltage power pack. As an example, a battery pack designed to produce approximately 300 volts at the battery terminals may comprise 84 cell groups each cell group connected in series to form a string of cell groups. Each cell group may comprise 3 individual cells connected in parallel; the individual cells may have a nominal cell voltage of approximately 3.5-3.6 Volts. In this example, any small change in individual battery cell voltage is multiplied by the number of cells in series, namely 84 in this example. Variations in production tolerances or operating conditions may produce a small difference between individual cells or cell groups that may be magnified with each charge or discharge cycle. To optimize battery operation, the use of cell balancing to equalize the charge on all of the cells in the series chain may be used to extend the battery life. Typically, battery cell balancing systems comprise electrical components including metal oxide semiconductor field effect transistors (MOSFETs), bipolar junction transistors (BJTs), diodes, capacitors, resistors, and other solid state devices. The electrical components of the cell balancing system typically are designed to operate at voltages that are a fraction of the battery pack voltage. To prevent a voltage greater than a component's maximum rating from being applied, some cell balancing components are separated (e.g., isolated) from the battery pack voltages. This isolation may be Galvanic isolation that may be implemented by an opto-isolator or a transformer. Further, many active cell balancing systems utilize a controller coupled with multiple cell balancing components in which the cell balancing components may be isolated from the controller, the vehicle traction battery power system, and chassis ground. The cell typically includes a positive terminal and a negative terminal. The terminals are connected either directly or indirectly with electrodes such as an anode and/or a cathode.

Charge equalization is important to both a state of charge of a power pack and an operational lifetime of the power pack. As stated above, often many low voltage cells or group of cells are connected either directly or indirectly in series to produce a power pack terminal voltage. A characteristic of this configuration is that all current for the power pack during both charging and discharging passes through each of the cells or group of cells. However, often one or more cells may have a cell voltage that differs because of history, manufacturing tolerances, or environmental conditions. As a cell discharges, that cell raises a pack resistance that is applied to a charger coupled with the pack. The increase in resistance reduces the power provided to each cell typically resulting in the other cells not being fully charged, or decreasing a rate of charge for the other cells. If the charging system is configured to and capable of raising the overall charging voltage to compensate for the resistance, the weaker cell will begin to heat up and further deteriorate. A weaker cell will contain less charge, therefore the other cells will need to be compensated to equate their charge with the lower charge cell.

Essentially, each battery cell acts as an integrator. Small changes in capacity of any one cell of the system may cause an increase in changes in how the system operates. If a few cells or cell groups of the pack have lower voltages, current may drain from a few batteries. Battery life is a strong function of charging/discharging history, and better cell voltage regulation enhances system life. One solution is charging in parallel and discharging in series. In large power systems such as an electric car or a hybrid vehicle, maintaining uniform charge in individual battery cells or battery cell groups is desired.

The two main methods to balance battery cell charge in a group of battery cells are passive balancing and active balancing. Passive balancing is reducing a state of charge of a battery cell by converting the energy to thermal energy or heat. Here, a slight overcharge of a battery cell may be detrimental to the life of the battery cell and the excess charge is released as thermal energy via an external circuit connected in parallel to each cell. The external circuit is typically a resistor and may include a solid state switch such as a MOSFET or BJT to connect and disconnect the resistor from the battery cell. Passive cell balancing may be used on many batteries technologies and topologies. Passive balancing is typically used in newer advanced battery systems such as Lithium ion type batteries.

Active balancing is the active movement of an electric charge from one cell to another cell. Active balancing is applicable for most battery technologies and topologies. Active cell balancing may transfer energy from one individual cell to the battery pack as a whole, from the battery pack as a whole to one individual cell, or from one individual cell to a different individual cell. Generally, energy is transferred from a cell with a high state of charge to a cell with a low state of charge. Likewise, electric charge may be transferred to battery cells that have a low state of charge.

Within a battery system like a Battery Energy Control Module (BECM) there exists a need to balance the state of charge on one or more cells of a battery pack. To minimize energy consumption draining the vehicle low voltage (12V) battery, a controller, such as a BECM, will determine any balancing need, and then the controller will turn itself off or go to sleep. Typically, cell monitoring IC's are powered separately from the HV battery and therefore can remain on independently to balance, based on the balancing demand, for a predetermined period of time. At the end of a predetermined time interval, the BECM may turn off cell balancing (e.g., via a microcontroller wake-up) and re-evaluate any need for further cell balancing. If more cell balancing is necessary, the cell balancing may be enabled again and the predetermined time interval may be reset.

A wakeup time interval may be implemented by a timer control circuit, such as a real time clock module (RTC) or some other timer (e.g., integrated circuit (IC)) used to manage this function. If the main tinier fails to wake the controller of the cell balancing, the balancing loads would not be switched off thereby leading to an over discharge condition on the cells being balanced. If this discharge causes one or more cells to be discharged below some controller determined limit, the battery pack will log fault codes and be rendered dead and unusable. A single timer (e.g., main timer) used to cease balancing does not meet the standard (i.e., ASL-"C" or "D" system) and a backup/alternate timer may be required to assure balancing will be disabled and turned off.

A common way to perform a secondary balancing disable or wakeup timer function is with an analog resistor/capacitor (RC) circuit, or a current source/capacitor in which the current source is used in place of the resistor of an RC circuit. If the desired timeout is very long, e.g. 30 minutes, the values of the resistors and capacitors of an RC circuit may become very large. With large values, fluctuations in resistance and capacitance may occur and these fluctuations may be affected by external considerations. Thus, as the resistance increases these external considerations may have a compounded effect.

Another detrimental aspect is the value of the capacitance required to create a long timeout. A large capacitance value may require use of an aluminum electrolytic capacitor that may have a relatively large leakage current and values that vary considerably. Lastly the long timeout is achieved through small currents interacting with these components in which leakages and temperature variations typically result in large errors. In practice, the use of only analog circuitry is difficult to manufacture as variations in tolerances is magnified by the small currents, and the available component selection require use of materials that have low reliability.

Here, an oscillator driving a long counter chain of flip-flops (F-F) divide the oscillator rate down to a very slow rate. By using a flip-flop chain that divides by a large number (e.g., $2^{24}$ times or 16,777,216) the oscillator rate may be a value that does not interfere with other electrical systems. Typically, a main timer is and a backup timer are used as a redundant system so that the battery power is not depleted. For example, an RC oscillator set at 9.3 KHz, and divided by $2^{24}$ (by using the output after the $24^{th}$ flip-flop) will output an approximate 30-minute period, interval, or timeout. It may be more desirable, for example, to use an output after the $19^{th}$ flip-flop (thus having a $2^{19}$ or 524,288 division/timeout) rather than the $2^{21}$ as the oscillator may be at a more convenient frequency. By using a chain that divides by $2^{19}$ times, the oscillator may be of a convenient frequency that can easily generate the required delay. While many oscillator rates and divisor combinations will work for the application, the $2^{19}$ divisor rate will provide a timeout as required by the backup timer. Use of the $2^{19}$ divisor with an oscillator set to 300 Hz will produce a proper backup timer interval yet be slow enough to create very minimal EMC effects/concerns, and after the division of $2^{19}$ the output will be 29 minutes. In another example, a 32 KHz watch crystal may be used in combination with a 26-stage frequency divider (having a $2^{26}$ or 67,108,864 count timeout) to produce an approximate 35-minute timeout. The backup timer may use digital logic such as a dedicated multi-stage (e.g., n-stage frequency divider) frequency divider, a Programmable Logic Device (PLD), a Programmable Array Logic (PAL), a Generic Array Logic (GAL), a Field-Programmable Gate Array (FPGA), an Application Specific IC (ASIC), or other integrated circuit may be used to generate the timeout. In another embodiment, backup timer may be a non-processor logic circuit in that it is not implemented by a microprocessor or microcontroller. As a microprocessor and microcontroller, during operation, executes instructions that are stored in memory, a non-processor logic circuit does not execute instructions that are stored in memory. Like the use of a 32 KHz crystal, other crystal or resonator may be used. The timer may use integrated logic blocks, like flip-flops and inverters. Going further, the whole oscillator and counter chain can be found in a single IC (e.g., a 24-stage frequency divider) or in yet another embodiment, the backup timer may be accomplished by a microcontroller.

The front end of this device may have all the necessary inverters and buffers to build an oscillator from simple resistor capacitor (RC) network, a crystal, or resonator. It may be beneficial to use a differential amplifier or other unbuffered or "raw" inverter to support oscillations (e.g., a crystal). Further, the logic device may simply accept a clock signal from some other source such as another IC. The oscillator output then is fed into the flip-flop divider chain where it is divided successively. For example, considering a 24-stage frequency divider IC that typically includes outputs of stages 18 through 24 such that multiple options may be considered. It also may be advantageous to integrate an external reset pin to the logic IC, allowing control of the start time for the timeout interval. Additionally, the reset may be used to abort the timeout interval, as in this case when the main duration from the main controller shuts down balancing, or a vehicle start occurs.

FIG. 1 depicts a typical plug-in hybrid-electric vehicle (PHEV) having a powertrain or powerplant that includes the main components that generate power and deliver power to the road surface for propulsion. A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an internal combustion engine 18 also referred to as an ICE or engine. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. A powertrain has losses that may include transmission losses, engine losses, electric conversion losses, electric machine losses, electrical component losses and road losses. These losses may be attributed to multiple aspects including fluid viscosity, electrical impedance, vehicle rolling resistance, ambient temperature, temperature of a component, and duration of operation.

A traction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery). Here, a high-voltage domain is a number of components and modules that operate and are powered substantially by the terminal voltage of the traction battery 24. The high-voltage domain includes the traction battery 24, the switch 42, the power conversion module 32, the power electronics module 26, the electric machine(s) 14, the DC/DC converter module 28, and the electrical loads 46. The high-voltage domain does not include the auxiliary battery 30 and loads that are powered by the auxiliary battery 30. It should be noted that some modules may operate in both the high-voltage domain and a low-voltage domain (operate and powered by the auxiliary battery 30), however, within those modules the circuits and systems are separated. For example, the DC/DC converter module 28 is coupled between the high-voltage domain and the auxiliary battery 30, however the DC/DC converter 28 separates the low-voltage domain from the high-voltage domain. The separation is achieved by modulation of IGBTs and use of an inductive element of the DC/DC converter 28 such that the energy potential on either side of the DC/DC converter 28 is substantially maintained. In many vehicles, high-voltage loads within the high-voltage domain are isolated from low-voltage loads within the low-voltage domain such that modules of either domain communicate via opto-isolators, transformers, wireless transceivers, or other communication across isolation techniques.

In some vehicles, the auxiliary battery 30 and low-voltage domain is Galvanically isolated from the high-voltage domain in that there is no DC/DC converter 28 but instead operate the low-voltage domain via an alternator coupled with the engine 18 and operate the electric machine(s) 14 via the traction battery 24. In this type of system, modules may communicate via opto-isolators, transformers, wireless transceivers, or other communication across isolation techniques.

The vehicle 12 may be an electric vehicle or a plug-in hybrid vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 or auxiliary electric loads may be connected to the high-voltage bus. The electrical loads 46 may have an associated controller that operates and controls the electrical loads 46 when appropriate. Examples of auxiliary electric loads or electrical loads 46 include a battery cooling fan, an electric air conditioning unit, a battery chiller, an electric heater, a cooling pump, a cooling fan, a window defrosting unit, an electric power steering system, an AC power inverter, and an internal combustion engine water pump.

The various components discussed may have one or more associated controllers to control and monitor the operation of the components. The controllers may communicate via a serial bus (e.g., Controller Area Network (CAN), Ethernet, Flexray) or via discrete conductors. A system controller 48 may be present to coordinate the operation of the various components.

Figure 2:
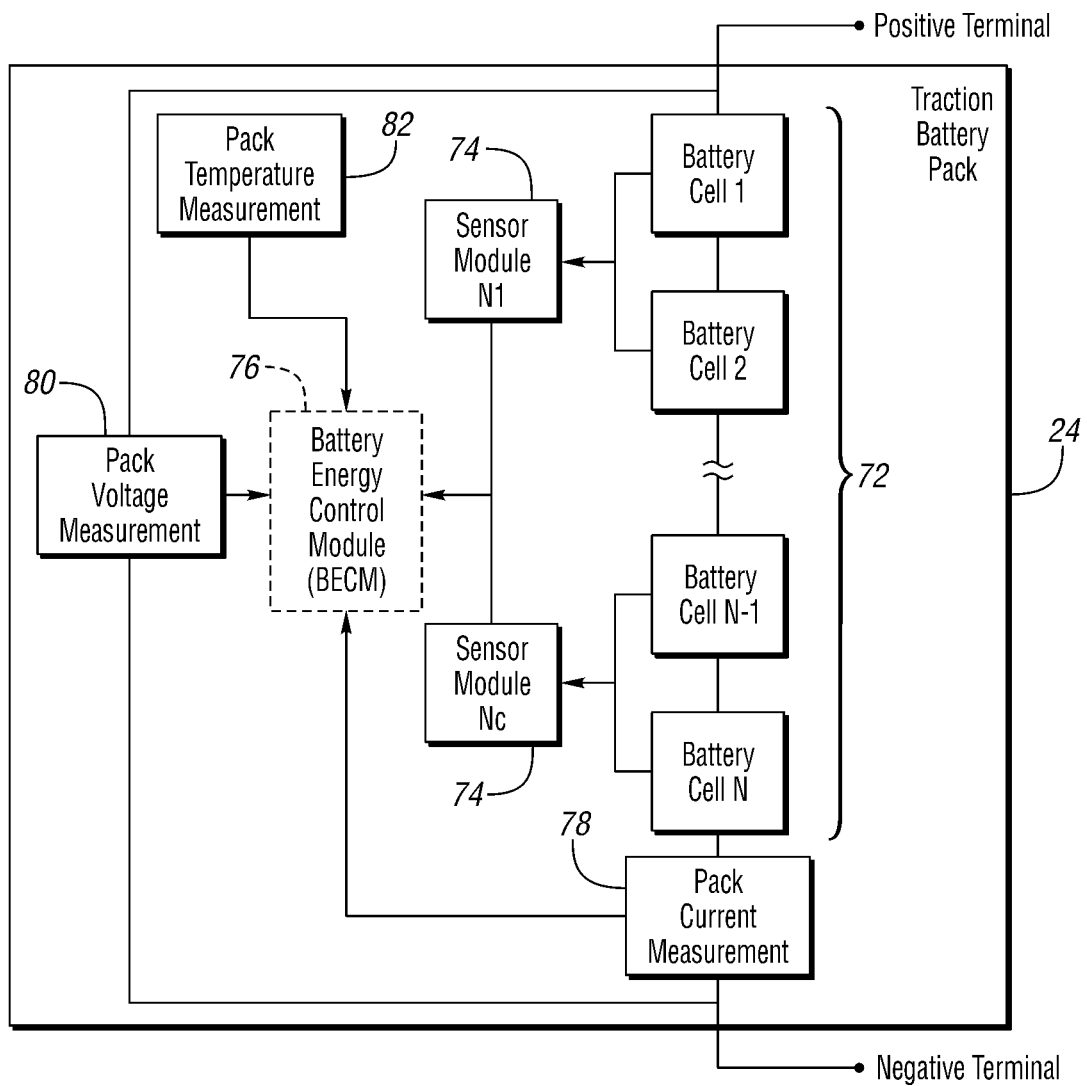
FIG. 2 is an exemplary diagram of a battery pack controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery management system may have one or more controllers, such as a Battery Energy Control Module (BECM) 76 that monitors and controls the performance of the traction battery 24. The BECM 76 may include sensors and circuitry to monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell level characteristics that are measured and monitored. For example, the terminal voltage, current, and temperature of each cell 72 may be measured. The battery management system may use a sensor module 74 to measure the battery cell characteristics. Depending on the capabilities, the sensor module 74 may include sensors and circuitry to measure the characteristics of one or multiple of the battery cells 72. The battery management system may utilize up to $N_c$ sensor modules 74 such as a Battery Monitor Integrated Circuits (BMIC) module to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module hardware may be integrated as part of the circuitry in the BECM 76 and the BECM 76 may handle the processing of raw signals.

The BECM 76 may include circuitry to interface with the one or more contactors 42. The positive and negative terminals of the traction battery 24 may be protected by contactors 42.

Battery pack state of charge (SOC) gives an indication of how much charge remains in the battery cells 72 or the battery pack 24. The battery pack SOC may be output to inform the driver of how much charge remains in the battery pack 24, similar to a fuel gauge. The battery pack SOC may also be used to control the operation of an electric or hybrid-electric vehicle 12. Calculation of battery pack SOC can be accomplished by a variety of methods. One possible method of calculating battery SOC is to perform an integration of the battery pack current over time. This is well-known in the art as ampere-hour integration.

The BECM 76 may have power available at all times. The BECM 76 may include a wake-up timer so that a wake-up may be scheduled at any time. The wake-up timer may wake up the BECM 76 so that predetermined functions may be executed. The BECM 76 may include non-volatile memory so that data may be stored when the BECM 76 is powered off or loses power. The non-volatile memory may include Electrical Eraseable Programmable Read Only Memory (EEPROM) or Non-Volatile Random Access Memory (NVRAM). The non-volatile memory may include FLASH memory of a microcontroller.

When operating the vehicle, actively modifying the way battery SOC is managed can yield higher fuel economy or longer EV-mode (electric propulsion) operation, or both. The vehicle controller must conduct these modifications at both high SOC and low SOC. At low SOC, the controller can examine recent operating data and decide to increase SOC via opportunistic engine-charging (opportunistic means to do this if the engine is already running). This is done to provide longer EV-mode operation when the engine turns off. Conversely, at high SOC, the controller can examine recent operating data and other data (location, temperature, etc.) to reduce SOC via EV-mode propulsion, reduced engine output, or auxiliary electrical loads. This is done to provide higher battery capacity to maximize energy capture during an anticipated regenerative braking event, such as a high-speed deceleration or hill descent.

Figure 3:
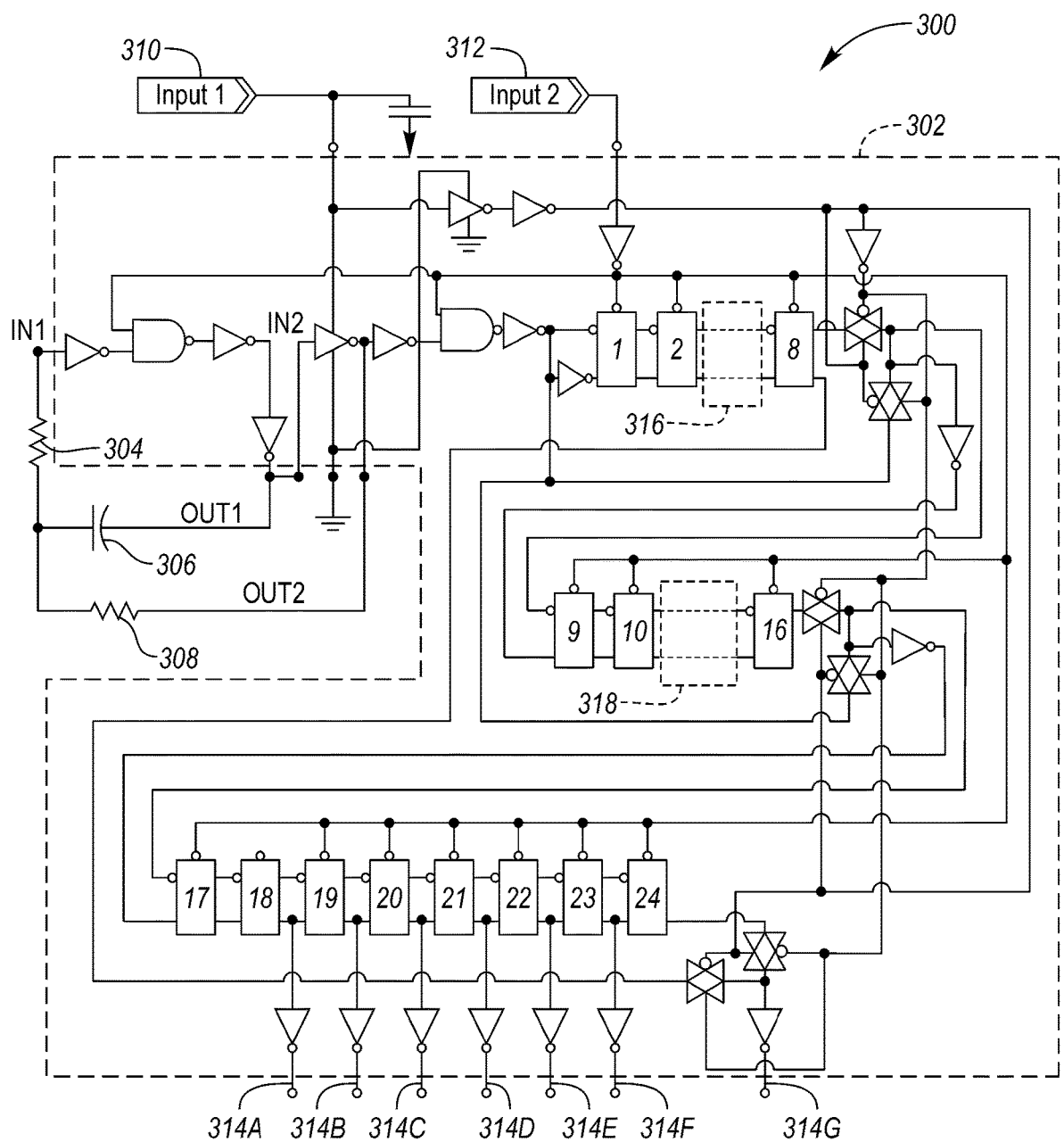
FIG. 3 is an exemplary schematic diagram illustrating a timer for a charge balancing circuit.

FIG. 3 is an exemplary schematic diagram illustrating a timer for a charge balancing circuit 300. A timer logic circuit 302 may use an oscillator such as a crystal, resonator, or Resistor-Capacitor (RC) to create a reference clock. In this illustration, resistor 304, capacitor 306 and resistor 308 form the RC oscillating circuit with feedback. Although this illustration shows an RC oscillator, this circuit 300 may use a crystal, crystal oscillator, resonator, or other clock generator. The first resistor 304 is connected between a first input and both the capacitor 306 and feedback resistor 308. The other lead of the capacitor 306 is coupled with a first output that is a buffered version of the input and to a second input while the second output is an inverted output of the second input and the feedback resistor 308 and the capacitor 306 set the clock rate. Once the oscillations start, the oscillations are propagated through a series of flip-flops (e.g., latches) to decrease a toggle rate by a factor of 2. For example, $2^n$ in which n is the number of flip-flops in the counter chain. Further, the circuit may include a first control input 310 and a second control input 312. The first control input 310 may an activation input, and the second input 312 may be a reset input. After propagating through the flip-flops of the logic circuit 302, one or more outputs (314) may be used to provide a signal based on the time rate. Here, the a $18^{th}$ output 314A toggles at a $2^{18}$ time based compared with the original RC. Likewise, a $19^{th}$ output 314B toggles at a $2^{19}$, a $20^{th}$ output 314C toggles at a $2^{21}$, a $22^{nd}$ output 314D toggles at a $2^{22}$, a $23^{rd}$ output 314E toggles at a $2^{23}$, a $24^{th}$ output 314F toggles at a $2^{24}$, and a $25^{th}$ output 314G toggles at a $2^{25}$. This logic circuit 302 utilizes a chain of 24 flip-flops to create the time base, however, a flip-flop chain may be larger or smaller dependent upon the battery chemistry and system design.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery system comprising:
a traction battery powering a high-voltage domain;
a traction battery controller powered by a low-voltage domain, separated from the high-voltage domain, and configured to disable cell balancing of the traction battery after expiration of a main timer; and
a backup controller, powered by and within the high-voltage domain, implementing a backup timer, that includes a non-processor logic circuit, and configured to disable cell balancing after expiration of the backup timer.

2. The battery system of claim 1, wherein the non-processor logic circuit includes a chain of flip-flops.

3. The battery system of claim 1, wherein the non-processor logic circuit is a n-stage frequency divider, in which n is greater than 17.

4. The battery system of claim 1, wherein the non-processor logic circuit is a digital timer.

5. The battery system of claim 1, wherein the backup timer further includes an oscillator.

6. The battery system of claim 5, wherein the oscillator includes a crystal or resonator.

7. The battery system of claim 5, wherein the oscillator is coupled with a differential input operational amplifier of the non-processor logic circuit.

8. The battery system of claim 5, wherein the oscillator oscillates at a rate that is less than 1 MHz.

9. The battery system of claim 5, wherein the oscillator is a 32 Khz crystal.

10. A battery system comprising:
a traction battery sourcing a high-voltage domain;
a traction battery controller powered by a low-voltage domain and Galvanically isolated from the high-voltage domain and configured to inhibit cell balancing of the traction battery after a timeout duration; and
a backup timer, powered by and within the high-voltage domain, including an oscillator and digital logic, and configured to inhibit cell balancing of the traction battery after a backup duration that is greater than the timeout duration.

11. The battery system of claim 10, wherein the digital logic includes a chain of flip-flops.

12. The battery system of claim 10, wherein the oscillator includes a crystal or resonator.

13. The battery system of claim 10, wherein the oscillator is coupled with a differential input operational amplifier of the digital logic.

14. The battery system of claim 10, wherein the digital logic is an n-stage frequency divider, in which n is greater than 17.

15. The battery system of claim 10, wherein the digital logic is a microcontroller, programmable logic device (PLD), field programmable gate array (FPGA), programmable array logic (PAL), generic array logic (GAL), or application specific integrated circuit (ASIC).

16. The battery system of claim 10, wherein the oscillator oscillates at a rate that is less than 1 MHz.

17. A traction battery comprising:
battery cells;
cell balancing circuitry configured to balance charge among the battery cells and to be disabled by a Galvanically isolated controller after a timeout duration; and
a backup timer, powered by the battery cells and including an oscillator and digital logic, and configured to disable cell balancing of the battery cells after a backup duration that is greater than the timeout duration.

18. The traction battery of claim 17, wherein the digital logic is an n-stage frequency divider, in which n is greater than 17.

19. The traction battery of claim 17, wherein the oscillator includes a crystal or resonator.

20. The traction battery of claim 17, wherein the digital logic is a microcontroller, programmable logic device (PLD), field programmable gate array (FPGA), programmable array logic (PAL), or generic array logic (GAL).

* * * * *